United States Patent

Boling

[11] 4,105,956
[45] Aug. 8, 1978

[54] Q-SWITCHED LASER AND LASER ROD

[75] Inventor: Norman L. Boling, Toledo, Ohio

[73] Assignee: Owens-Illinois, Inc., Toledo, Ohio

[21] Appl. No.: 730,038

[22] Filed: Oct. 6, 1976

[51] Int. Cl.² ............................................. H01S 3/111
[52] U.S. Cl. ........................... 331/94.5 Q; 331/94.5 T
[58] Field of Search ..................... 331/94.5 Q, 94.5 T, 331/94.5 D

[56] References Cited

U.S. PATENT DOCUMENTS

| 3,315,177 | 4/1967 | Benson | 331/94.5 Q |
| 3,434,073 | 3/1969 | Forkner | 331/94.5 Q |
| 3,487,331 | 12/1969 | Gates | 331/94.5 Q |

Primary Examiner—William L. Sikes
Attorney, Agent, or Firm—Steve M. McLary; Myron E. Click; David H. Wilson

[57] ABSTRACT

An improved Q-switched laser and laser rod in which the threshold of double pulsing is significantly raised. In a Q-switched laser, the laser cavity includes a front mirror which is partially transmissive, a rear mirror element and a lasable rod like element positioned between the two mirrors. The rear mirror is controlled in such a manner that it sequentially presents reflective and nonreflective surfaces to the laser rod. This then prevents lasing action from occurring until such time as the reflective surface is presented to the rod. In order to prevent double pulsing, pulsing which occurs as the rear mirror is moving into its proper alignment, a pulse suppression optical discontinuity is provided within the laser cavity. This may take the form of a bevel portion on one end of the laser rod itself. The bevel portion is aligned such that it is positioned in the direction of opening of the rear mirror to the rod. The bevel is preferably positioned at an angle greater than the critical angle of the material of the laser rod and serves to prevent shallow angle reflections and refractions from being propagated through the rod or from mirror to mirror.

19 Claims, 8 Drawing Figures

Q-SWITCHED LASER AND LASER ROD

BACKGROUND OF THE INVENTION

This invention generally relates to Q-switched lasers in which the rear mirror element is a rotating type mirror element. More specifically, this invention relates to double pulse suppression in such lasers by the provision of a pulse suppression optical discontinuity within the laser cavity. More specifically, this invention relates to such a laser in which the pulse suppression discontinuity is provided by a bevel portion on the laser rod element within the laser cavity.

Q-switched lasers are well known in the art. Such lasers are designed to delay the generation of the amplified lasing pulse until such time as the lasing medium has been pumped or activated to its maximum possible energy level. To achieve this purpose, Q-switched lasers have a rear mirror that is blocked from view of the laser rod for a short period of time during the pumping of the laser rod by a flash tube. It is therefore not possible for the pulses which exit along the axis of the rod to be reflected back into the rod and cause amplification which eventually leads to the laser pulse. At such time as the mirror does come into alignment with the rod, a laser pulse is generated within a very short time frame which gives maximum power release. However, this theoretical consideration is somewhat distorted by the practicalities of realistic operating lasers. The use of rotating rear mirror elements is common in many Q-switched type lasers. This is because the electrically switchable cells are quite fragile, expensive, and difficult to operate. The rotating type rear mirror system does, however, lead to a problem known as double pulsing. In this situation, it is possible for very shallow angle photon beams to be reflected from the surface of the rotating mirror before it has come into complete alignment with the axis of the laser rod. What occurs is that the shallow angle photon beams are reflected back and forth from the rear mirror along the rod to the front mirror and back again at these shallow angles along the edges of the laser rod. It is possible to achieve sufficient amplification in this initial mode to generate a laser pulse. Then, when the mirror has come into its desired alignment position, the laser pulse which is desired is generated. It should thus be clear that two pulses actually occur, double pulsing, which is undesirable since part of the energy which has been stored is dissipated in the initial pulse, and the two pulses make it difficult to use the desired single pulse for measurement purposes. The prior art has attempted to overcome this problem by positioning a metal element such as a knife or razor edge into the path of travel of such shallow angle reflected photon beams adjacent to the rear mirror. While this has had the effect of significantly reducing the double pulsing phenomenon, when the main pulse is generated enough of the laser beam is scattered to cause damage to the razor edge. Small fragments of metal are vaporized and thrown off from this edge as a result of contact by the laser beam. This vaporized metal is then deposited on the optical surfaces within the laser cavity leading to degrading the performance of the laser. I have found that if an optical discontinuity is provided on one of the optical surfaces defining the laser cavity, it is possible to prevent or block propagation of the off axis shallow angle photon beams. This occurs by virtue of the fact that the beams may be either completely internally reflected, reflected away from the rod, or diffusely scattered to such an extent that they are unable to re-enter or leave the laser rod itself and thus lead to quenching of the amplification action within the rod. As one specific example of such an optical discontinuity, a bevel portion may be cut across one face of the laser rod at any angle which is preferably at least as great as the critical angle of the material from which the laser rod is formed. This bevel must be positioned so that it faces in the direction into which the rotating rear mirror element opens.

SUMMARY OF THE INVENTION

My invention resides in a Q-switched laser which includes in its laser cavity a front partially transmissive mirror. Also included in the laser cavity is a rotating rear mirror switching means, which is spaced apart from the front mirror, for causing a rear mirror to be optically aligned for precise retro-reflection with the front mirror only when a laser pulse is desired. The laser cavity is completed by an elongated, solid, rod like laser rod member, which includes polished front and rear faces, positioned between the front mirror and the rear mirror switching means. The laser cavity includes four optical surfaces as defined by the front and rear mirrors and the front and rear polished faces of the laser rod. The Q-switched laser also includes a flash tube for providing pumping power for the laser. My improvement in the laser cavity to suppress premature lasing action comprises a pulse suppression optical discontinuity, integrally formed on one of the four optical surfaces of the laser cavity, which is positioned to be in general alignment to the direction of opening of the rear mirror to the laser rod. The pulse suppression optical discontinuity thereby prevents propagation of shallow angle reflected or refracted beams within the laser cavity.

DETAILED DESCRIPTION OF THE DRAWINGS

Figure 1:
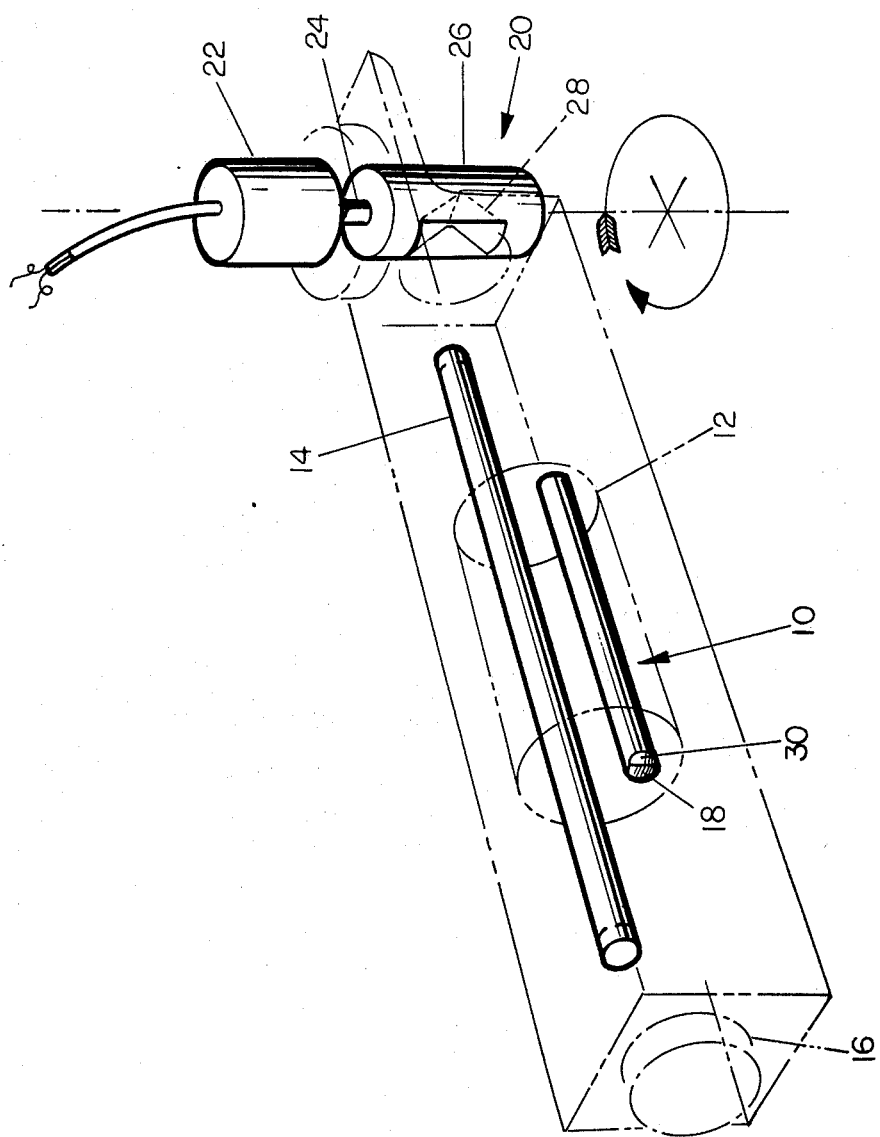
FIG. 1 is a perspective, schematic view of a Q-switched laser using a rotating rear mirror switching means.

FIG. 1 illustrates in schematic form the components of a typical Q-switched glass laser. As is known to those skilled in the art, a Q-switched laser is a laser which is designed to delay the generation of the amplified lasing pulse until such time as the lasing medium has been pumped or activated to its maximum energy level. The example of a glass laser is simply by way of illustration.

The present invention will improve the operation of any Q-switched laser which uses a solid rod of material containing a lasable material and a rotating mirror element. Other suitable materials are, for example, ruby and YAG. In a typical glass laser, a glass rod which contains a lasable material, such as neodymium, is positioned between a partially reflective front mirror and a wholly reflective rear mirror. When pumped by a source such as a flash tube, the spontaneous emissions from the lasable material within the rod create pulses of light which are reflected back and forth along the axis of the rod between the mirrors, until such time as a pulse of light emerges through the partially reflective front mirror. For some applications, it is desired to delay the generation of the pulse of laser light until such time as the rod, or the medium within the rod, has been pumped to its maximum possible energy level. In so doing, the power release is maximum in that the release of the stored energy is delayed and then released within a short time period, as opposed to the general case where pulse generation is allowed to proceed naturally as pumping begins. It is known, and should be noted of course, that the time periods which are referred to are exceedingly short time periods, but nonetheless it is quite possible to measure the difference in the pulse shapes which are obtained in terms of the power output. There is a significant difference in the duration of the pulses themselves and therefore the applications to which they may be put. To this end, Q-switched lasers have a rear mirror which is blocked from view of the laser rod for a short period of time during the pumping of the laser rod by the flash tube. It is therefore quite impossible for the pulses that exit along the axis of the rod to be reflected back into the rod and cause the amplification which eventually leads to the laser pulse or laser light beam itself. Rather, a means is provided to shield the rear mirror from the rod during the initial time period and then present the rear mirror in optical alignment for precise retro-reflection with the front mirror along the axis of the rod, within a very short period of time, which then allows a very intense pulse of light to be generated down the axis of the rod. The entire system at the rear of the rod may be considered to be a rear mirror switching means or device which sequentially presents reflective and non-reflective surfaces to the rear face of the laser.

The enclosure for the laser is actually shown in phantom lines in FIG. 1 and mounting details, of course, have been omitted. However, the view is quite adequate to allow one to understand the general operational principles of such a laser. A laser rod 10 is positioned within a reflective mirrored pumping cavity 12 which also has included within it a flash tube 14. The flash tube 14 is provided as the energy source for pumping the laser rod 10. This flash tube may be any of the type which are well known in the art, for example, Xenon flash tubes. The reflective pumping cavity 12 is designed to allow the maximum quantity of light presented by the flash tube 14 to be absorbed by the laser rod 10. In FIG. 1, the laser rod 10 is shown as being a cylindrical or round rod. However, the term "rod" is more general than simply a round rod and may include any configuration of elongated member which may be used to serve the function of a lasing element. The round configuration is for convenience and ease of manufacturing. Nonetheless, the generality of the term "rod" should not be limited by the showing of a cylindrical rod in FIG. 1. A front partially transmitting mirror 16 is located a spaced apart distance from a polished front face 18 of the laser rod, although the mirror 16 could be located on the end of the rod 10. Behind the laser rod 10, or to the rear, is located a rear mirror switching device 20 whose function is to present a completely reflecting rear mirror and non-reflecting surface in a sequential fashion to a polished rear face (not visible in FIG. 1) of the laser rod 10. In this specific example shown in FIG. 1, the rear mirror switching device 20 includes a drive motor 22 which has an extending drive shaft 24 that in turn drives a prism housing 26. The prism housing 26 contains or carries a triangular prism 28. In the specific example here shown, the function of the rear mirror is actually served by the prism 28. The term mirror should thus be taken in its broadest sense as being an element which will reflect a significant percentage of the light incident upon it. As is known, one face of a prism of this type will give the effect of a mirror. The other faces, however, will not reflect light which is incident upon them. Thus, it is possible, by rotating the prism about a fixed axis to sequentially present reflecting and non-reflecting surfaces to the rear face of the laser rod 10. As has been pointed out, so doing will allow the control of the timing of the laser pulse and consequently its power output curves. In one sense, one may consider that the function of the rear mirror switching device is to quench or to hold back the lasing function until such time as it is desired. By not allowing a rear mirrored face to be present at all times, photons which exit from the rear face cannot be reflected back into the laser rod and thus the "chain reaction" within the rod is not allowed to proceed as would normally be the case. The rotational speed, to give a specific example, of the prism 28 is approximately 400 revolutions per second. The mirror 16 and the prism 28 with the laser rod 10 between them define a laser cavity. There are four optical surfaces in the laser cavity; the mirror 16, the prism 28 and the two polished end faces of the laser rod 10, only the face 18 being visible in FIG. 1. It will be noted that the front face 18 has removed from it and extending back along the axis of the laser rod 10, a beveled portion 30. This beveled portion 30 can be extremely critical to accurate operation of a Q-switched laser, as will now be explained with respect to the following drawing figures.

Figure 2:
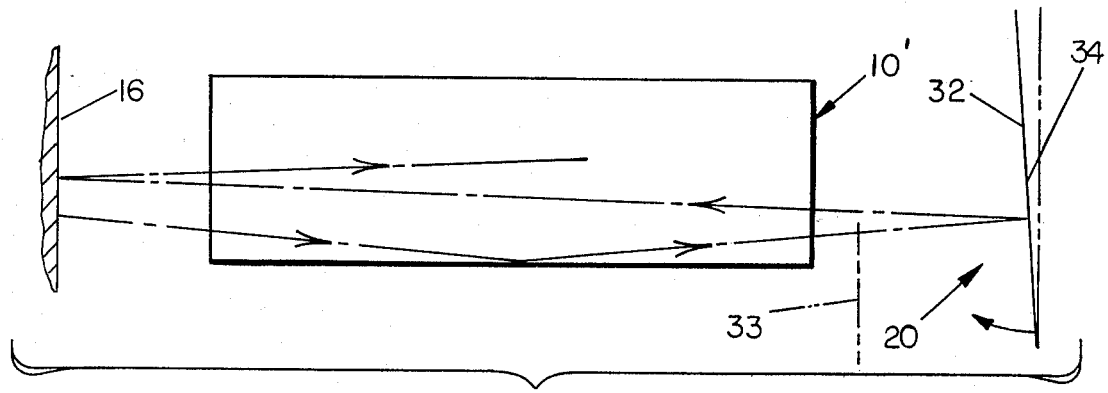
FIG. 2 is a top, plan view of a Q-switched laser similar to that shown in FIG. 1 illustrating the generation of a premature laser pulse.
Figure 3:
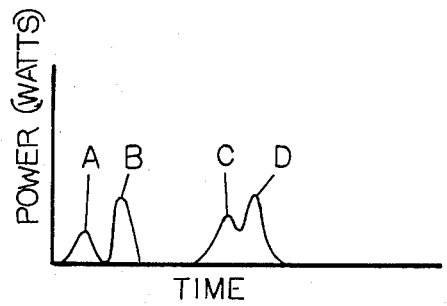
FIG. 3 is a chart illustrating the output of a Q-switched laser which exhibits double pulsing.

The operation just described has been that of a theoretically ideal, Q-switched laser. One area in which such lasers are utilized for their sharp pulse characteristics is in the area of range finders. Despite the theoretical sharp pulse characteristics of a Q-switched laser, in practice the basic geometric conditions of the system tend to defeat this theoretical advantage to some extent. Consider for example FIG. 2, in which a Q-switched laser is shown in a very schematic form. In this case, the rear mirror switching device 20 is shown simply as a rotating mirror which has one reflecting face 32 and a non-reflecting face 34. This is of course, a very simple case but it will serve to illustrate the problem which does occur in practice. The front mirror 16 may be identical to the mirror previously discussed. Likewise, the laser rod 10' shown is a conventional rod without the bevel portion 30. What actually occurs within the laser rod 10' is that a number of spontaneous photon emissions are occurring as the pumping continues or even as it has been completed and the mirror switching device 20 is moving into position to allow generation of the desired pulse. The desired laser pulse would take place during less than a minute of arc of rotation of the prism when the prism reflecting surface, rod 10, and front mirror would be in optical alignment. Unfortunately, as soon as the mirror reflective face 32 comes into near alignment with the polished rear face of the laser rod 10', it is possible for photons to be reflected at very shallow angles from the side of the rod 10' and then be reflected further by the mirrors. This may occur at angles as much as a few minutes of arc off perfect mirror alignment, and is illustrated in FIG. 2. What occurs is that these shallow angle photon beam reflections in effect "walk" across the diameter of the laser rod 10' by reflecting from front mirror to rear mirror and down the length of the rod. Because of the shallowness of the angles they do traverse the diameter of the rod 10' relatively quickly. The angles in question are generally of one degree or less. Light beams which are entered above this angle or reflected above this angle "walk" across the diameter of the laser rod 10' too fast to provide the necessary amplification for lasing action. However, in the case of those beams or bundles of photons which are reflected at just the right angles, an undesirable condition occurs. The traverse of such beams across the diameter of the rod 10' is sufficient to allow lasing action to take place, thus bleeding off part of the energy stored in the premature lasing action which is not desired. In addition to depleting stored energy which was desired for the single main pulse, FIG. 3 illustrates the problem which occurs when this particular function takes place. The first two peaks shown in FIG. 3 labeled as A and B illustrate one possible condition. That is, a relatively small peak A occurs as a result of lasing action taking place as the result of the traverse of the shallow angle reflected beams before complete rear mirrored face alignment has taken place. Then, a second pulse B occurs when the mirror axis are aligned with the laser rod as desired. It is the pulse B which is a desired pulse and which should be the only pulse available. It should be quite evident that in a range finder system the occurrence of two pulses such as A and B can be a complicating factor, since one desires only a single, uniform pulse for measurement. A second possible situation occurs as shown with the wave forms C and D in FIG. 3. In this case, there is a more uniform beginning, but a peak C is reached as the outer sites are depleted, and the pulse power begins to drop off. Then, the power rises again sharply to peak D as the mirror axis comes into alignment with the central axis of the laser rod 10'. The same net result occurs as was the case with the two distinct pulses A and B. Namely, there is confusion in determining precisely which pulse should be used for the desired measurement.

Figure 4:
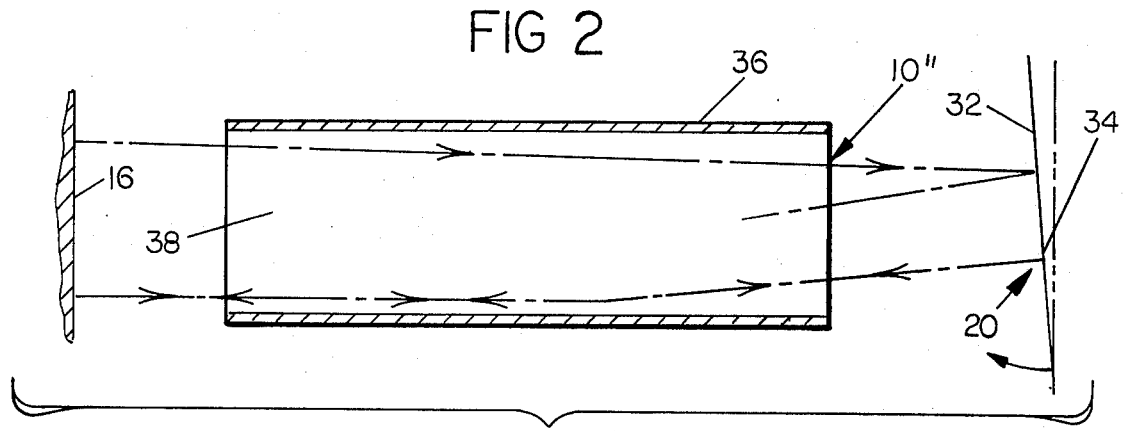
FIG. 4 is a top, plan view similar to FIG. 2 illustrating the generation of a premature laser pulse in a clad laser rod.

One possible way to avoid this situation is to clad or enclose the laser rod in a glassy material of composition identical to the central body of the laser rod 10', but having omitted from its composition or formulation the lasable element such as neodymium. The cladding composition will have included in it a material which is strongly absorbing of laser light in the expected wavelength. This is commonly done in the art and the techniques for doing this are well known. For example, by redrawing the laser rods 10', an outer shell of the same glass composition, omitting the lasable element, is put on laser rods today. FIG. 4 illustrates a Q-switched laser as shown in FIG. 2, but with the laser rod 10' replaced with a clad laser rod 10". The clad rod 10" includes an outer jacket or cladding 36, as described, around the center core portion 38. If the cladding were done perfectly and if all manufacturing tolerances were met at all times, the wave forms shown in FIG. 3 would be avoided and the condition illustrated in FIG. 2 would not exist. However, the practicalities of manufacturing tolerances are such that on occasion optical non-uniformities are set up at the interface between the original laser rod body 38 and the cladding or shell material 36 which is placed on it. At this interface, where these non-uniform areas exist, light beams are bent or refracted and will not go directly from the laser rod material into the cladding material. If those photons travelling at very shallow angles, such as those shown in FIG. 4, were to continue into the cladding material, they would be quenched, and the amplification reaction itself would be quenched at this point. However, the non-uniformity set up at the interface does allow some refraction to take place at this point. In fact, the situation with respect to clad laser rods is such that the refracted beams are generally reflected back upon themselves. This situation usually only occurs with beams up to a few tens of minutes of arc; above this angle, the cladding absorbs the beams. However, there is still sufficient time and density of beams to allow double pulsing. Thus there can be generated a premature laser pulse along the edge of the rod 10". In order to obtain laser rods for Q-switched lasers which are perfect in the sense that two pulses do not occur, it is necessary to accept an extremely high number of manufacturing rejects to find those rods which have just the proper stress distribution at the interface between the original rod material and the cladding material.

In an attempt to solve the problem, the prior art has proposed putting a physical aperture in the path of the shallow angle beams. This is shown in FIG. 2 by a thin, metal plate 33, shown in phantom lines. The plate 33 may be a razor edge member to achieve very sharp cut-off characteristics. As may be seen, the plate 33 does in fact intercept the shallow angle beam and does prevent double pulse lasing action. However, when the main pulse begins, there is some rearward spread of the main beam. This strikes the edge of the plate 33. Because of the power in the main beam and the thinness of the plate 33, parts of the plate 33 are vaporized. This material then deposits on the end of the rod 10' or on the mirror surface 32. The result is eventual degradation of the laser operation. Furthermore, the placement of the plate 33 is critical so that it does not interfere with generation of the main pulse. The damage it suffers from the action of the main beam destroys this critical positioning.

Figure 5:
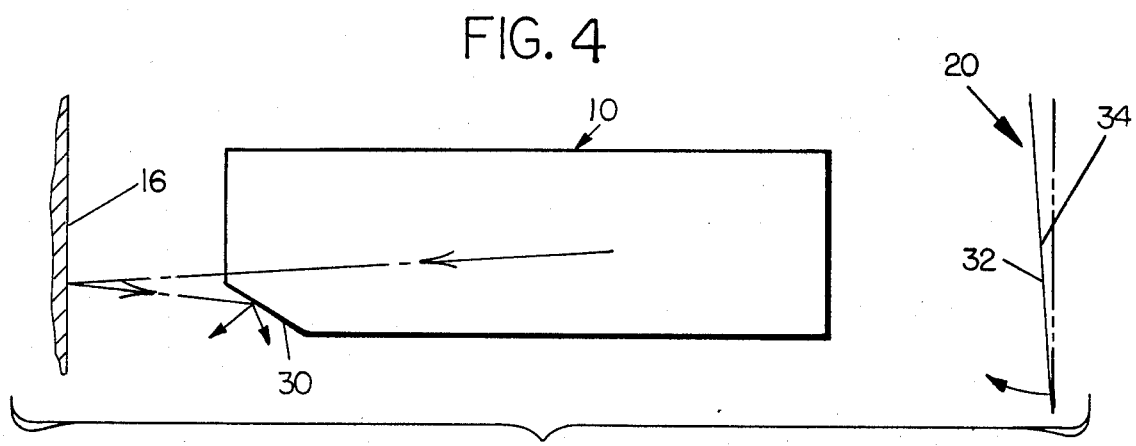
FIG. 5 is a top, plan view similar to FIG. 2 illustrating the use of a bevel portion on the laser rod to suppress double pulse generation.

FIG. 5 illustrates how this previously described problem of dual pulsing may be eliminated both in clad and unclad laser rods. The illustration of FIG. 5 is substantially identical to the schematic illustration of FIG. 2, but includes the laser rod 10 which was illustrated in FIG. 1. Note that this specifically includes the beveled portion 30 which is a critical component. As can be seen in FIG. 5, the same basic problem as discussed with respect to FIG. 2 is occurring. That is, premature photons are generated within the laser rod 10 and reflected by the mirror surface 32 prior to the time the mirror surface 32 is in the position desired for the single intense pulse of laser light. In contrast with what occurred in FIG. 2 though, the reflected beam from the front mirror 16 is intercepted by the beveled portion 30 rather than passing back into the rod as in FIG. 2. The beveled portion 30 may be a polished reflecting surface, in which case the beam will be at least partially reflected away from the rod axis and will not continue back into the rod 10, thus quenching the amplification action and preventing lasing action. Conversely, the beveled surface 30 may be a diffuse surface or a ground surface, in which case the reflected beam from the front mirror 16 is scattered and reflected to such an extent that it does not travel back along the axis of the rod 10, again quenching the amplification action within the rod 10. In either case, the net result of the presence of the beveled portion 30 is to prevent or block the propagation of the back and forth travel of photons from front mirror to rear mirror or vice versa and to thereby prevent the generation of a premature laser pulse. The beveled portion 30 may be positioned on either polished end face of the laser rod 10. It is shown adjacent the output or front mirror 16 in FIG. 5 by way of illustration.

Figure 6:
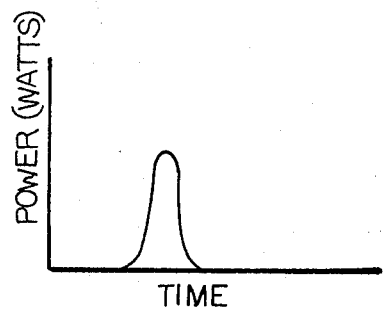
FIG. 6 is a chart illustrating the desired output wave form from a Q-switched laser.

FIG. 6 shows a power versus time curve of a typical Q-switched laser using the laser rod 10 having a beveled portion 30. Note that there are not two pulses present, but rather a single sharply defined pulse. A similar shape may be obtained using the edge 33.

Figure 7:
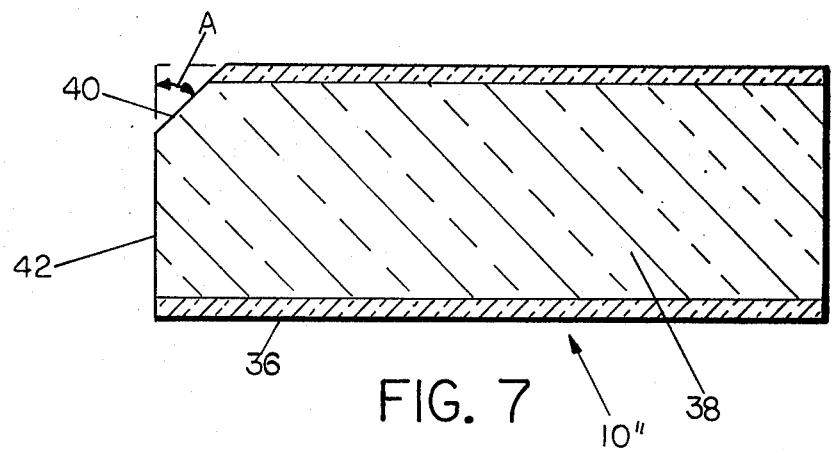
FIG. 7 is a side view of a clad laser rod having the beveled portion of the present invention.

FIG. 7 illustrates the clad laser rod 10" alone to further illustrate the use of a bevel portion to prevent undesirable double pulses in a Q-switched laser. In this case, the innermost portion of the clad laser rod 10" is made up of the rod 38 which may be substantially identical to the laser rod 10 without a bevel having been cut as yet. Then the inner rod is clad or encased with the outer casing material 36 which is identical in glass composition to the material of the inner rod 38, but has omitted therefrom the lasing element such as neodymium. As a final step, a beveled portion 40 is cut on the front face 42 of the laser rod 10" with the beveled portion 40 being generally of the same basic configuration as that of the previously noted bevel 30. Note that the beveled portion 40 must extend through and into the active portion 38 of the clad laser rod 10". This must be so in the case of a clad rod, since lasing action takes place only in the active portion; there can be no beam components in the cladding material itself.

The angle, shown as A in FIG. 7, of the beveled portion either 30 or 40 is not an extremely critical dimension, but is preferably greater than the critical angle for total internal reflection in the laser rod material in order to insure sufficient loss to suppress double pulsing. The beveled portions 30 and 42 may have either a polished surface or a diffuse surface. When a diffuse surface is used, it is possible to make the angle of the bevel much smaller than the critical angle. This is so because specular-reflections are not a concern in this case. The angle may, in fact, be zero; that is no material removed from the polished end but simply a diffuse area provided. This relationship is so since by definition the critical angle of a material is that angle at which total internal reflection will take place. When a pulse is incident on a bevel portion such as 40, it is totally reflected back into the rod if the bevel angle exceeds the critical angle of the material. This prevents the pulse from reaching a mirror for further reflection. Also it is worth considering that beveling the laser rod 10 or the clad laser rod 10" does indeed remove some of the active material from these rods. Likewise, a portion of their front faces is removed, which might lead one to consider that there is a net loss of available lasing area and the consequent loss of laser power. However, experimental measurements have shown that such is not the case and the suppression of the undesirable double pulsation and the steepening of the overall output wave form shape more than compensates for any small losses which are induced by the beveling process. Tests have shown actual power increases due to more efficient use of the stored energy. Energy is not drained off in early, undesired laser pulses. In actual fact approximately 5% of the total available active volume of a typical laser rod is removed by the bevel when the bevel angle is at approximately 40° with respect to the barrel or longitudinal axis of the laser rod.

Figure 8:
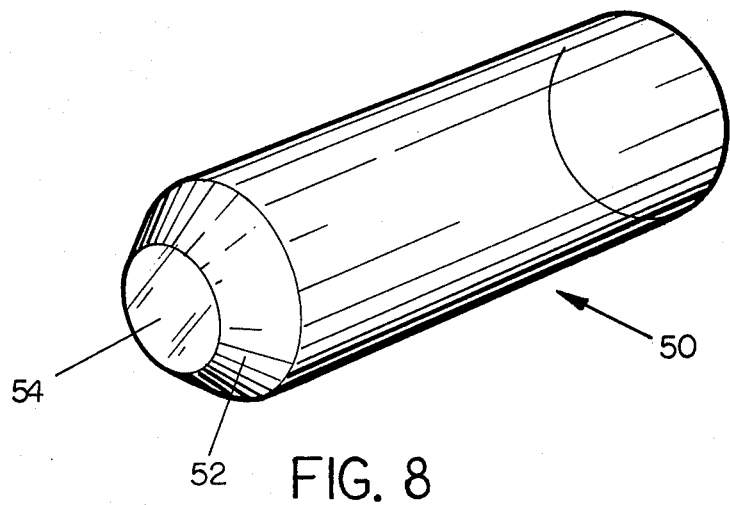
FIG. 8 is a perspective view of a laser rod having one face chamfered in accordance with another aspect of the present invention.

When a beveled laser rod such as those shown in FIGS. 5 or 7 are incorporated into a Q-switched laser as illustrated in FIG. 1, the precise alignment of the beveled portion itself with respect to the axis of rotation of the rod is not a critical dimension. That is, it has been pointed out that the premature lasing action can begin when the mirror has moved to within only a few minutes of arc from its completely invisible position. This would lead one to possibly speculate that a solution to this problem would be equally critical in terms of alignment with respect to the front and rear mirrors, leading to possible calibration complications. It has, to the contrary, been found that the positioning of the beveled portion of beveled laser rods is not extremely critical and an accuracy to within a matter of about 5° in terms of rotation of the rod is acceptable. To further explain this particular principle, it can be realized from the optics of the system that the axis of rotation of the rear mirror switching device must be parallel to the planes in which the bevel lies. The misalignment previously mentioned of the beveled portion then is a matter of about 5° with respect to precise parallel alignment of the planes of the beveled portion with respect to the axis of rotation of the rear mirror switching device. It is of course well known that the laser rod itself and the front mirror 16 and rear mirror switching device 20 must be very precisely aligned and positioned to allow the proper generation of the lasing pulse along the length of the rod. The relative insensitivity of the positioning of the beveled portion then does not introduce further complications in the alignment of the laser rod itself with respect to the two mirror segments. All angular sensitivity may be removed by chamfering a face of the laser rod. As seen in FIG. 8, a laser rod 50 can have a beveled portion extending completely around its circumference as a chamfer 52 formed in a face 54. The other dimensions of the chamfer 52 may be identical to those discussed with respect to the bevel portions.

While only the term "bevel" has been used, the actual function served by this portion of the laser rod is that of a pulse suppressor. The return path of a beam is interrupted or its propagation prevented by partial occlusion of the laser rod front face in the case of shallow angle reflections or, in the case of clad rod, refractions. This then blocks the amplification process. The following relationship, neglecting losses other than through the output mirror, gives the gain or amplification of a laser beam for a complete round trip through the entire cavity including the two mirrors and the rod:

$$G = r(1-x)^2 \exp(2l\epsilon\sigma)$$

$G$ = gain or amplification factor
$\epsilon$ = stored energy in Joules/Cm$^3$
$\sigma$ = the specific gain
$r$ = mirror reflectivity
$l$ = rod length
$x$ = single pass loss through a pulse suppression discontinuity of the rod Thus, for pulse suppression, the gain should be less than one or:

$$1 - X < r^{-1} \exp(-2\epsilon\sigma l)$$

As an example of the use of this formula, consider a laser rod made of an Owens-Illinois, Inc. commercially available laser glass known as ED-2. A typical system using such a laser rod may have an active core 0.48 cm in diameter with an overall diameter of 0.64 cm including cladding. The rod is 7.6 cm in length and the total cavity length is 18 cm. The laser is operated at a nominal level of $\epsilon = 0.27$ J/cm$^3$. In the calculations, a higher factor of $\epsilon = 0.54$ J/cm$^3$ is assumed as a safety factor. The value of $\sigma$ for ED-2 glass is 0.16 cm$^{-1}$/J/cm$^3$. Making all of these substitutions gives a value of $X \leq 0.36$. Further, for the ED-2 material the critical angle may be calculated to be 40°. This value sets a preferred angle for any polished bevel formed on rods made from the ED-2 material.

This now becomes a figure of merit for a particular laser system. This value allows calculation of the effect of such factors as anti-reflective coatings without experimental work since the absorptive and reflective properties of such coatings are well known. Thus, any interruption of the beam movement back into the rod, properly positioned of course, which gives a loss factor within the range of the known figure of merit will raise the double pulsing threshold of a Q-switched laser.

It should now be clear that the regular, half ellipse shaped bevel portion illustrated is not necessarily the only possible shape for the pulse suppression section of the rod. Other shapes may be used so long as the conditions set up on the preceeding discussions are met. The pulse suppression section must face into the direction that the mirror portion of the rear mirror switching device 20 opens. For example, in FIG. 1, the mirror opens by moving from right to left as viewed from the position of the front mirror 16. The bevel portion 30 therefore faces the right. If the same system had the mirror moving from left to right (counter-clockwise), the bevel portion 30 would be on the left side of the rod 10. The rear mirror switching device 20 could have the mirror rotating about a horizontal axis rather than a vertical axis. In this case, the bevel portion 30 would be on the top or bottom of the rod 10, depending on how the mirror opened. Further, in the most general sense, one may consider that the improvement lies within the laser cavity in general. To this end, the improved results may be obtained by including an integrally formed pulse suppression discontinuity in one of the optical surfaces of the laser cavity to prevent the return of shallow angle reflected or refracted light beams into the body of the laser rod element of the laser cavity.

While both FIGS. 2 and 4 illustrate the generation of undesirable double pulses, the mechanism involved is different in the two cases, even though the solution to the problem is the same. In the case of an unclad rod 10', FIG. 2, the beams which create the problems are reflected at very shallow angles at the rod/air interface. The shallow angle and the rear mirror misalignment allow sufficient passes of these beams across the diameter of the rod 10' to generate a premature laser pulse. In the case of a clad rod 10'', FIG. 4, there is a refraction of beams at the core/cladding interface. These refracted beams impinge on the mirrors normally. They are then reflected back upon themselves. This then leads to generation of a laser pulse in the outermost portions of the rod 10'', thus depleting the stored energy in this area. In the case of the unclad rod, the area from which the energy for the premature pulse is taken is not so localized, but may come from the central axis portion of the rod 10'.

What is claimed is:

1. In a Q-switched laser which includes a front, partially transmissive mirror, a rotating rear mirror switching means, spaced-apart from said front mirror, for causing a rear mirror to be optically aligned for precise retro-reflection with the front mirror only when a laser pulse is desired, and a flash tube for providing pumping power for said laser, an improved laser rod member, positioned between said front mirror and said rear mirror switching means, which comprises:

an elongated, solid, rod like member made from a material containing a lasable element, said rod like member including front and rear polished faces, said rod like member further including pulse suppression means for preventing the passage of shallow angle reflected or refracted beams through said rod like member, said pulse suppression means being integrally formed on the edge of one of said polished faces and extending towards the center of said polished face an extent great enough to allow interception of said shallow angle beams.

2. The improvement of claim 1 wherein said rear mirror switching means includes a rotating member which alternatively and in repeating sequence brings reflective and non-reflective surfaces into optical alignment with said rod and said front mirror and wherein said pulse suppression means comprises a bevel portion extending across one polished face of said rod and toward the other one of said polished faces, said bevel portion being at an angle with respect to the longitudinal axis of said rod that is preferably at least as great as the critical angle of the material from which said rod is formed and being positioned to be in general alignment to the direction of opening of said reflective surface to said rod.

3. The improved laser rod of claim 2 wherein said bevel portion has a polished, reflecting surface.

4. The improved laser rod of claim 2 wherein said bevel portion has a diffuse surface.

5. The improved laser rod of claim 2 wherein said bevel portion comprises a chamfer extending about the entire circumference of said laser rod.

6. The improved laser rod of claim 2 wherein said bevel portion faces said front mirror.

7. The improved laser rod of claim 2 wherein said bevel portion faces said rear mirror.

8. The improvement of claim 1 wherein said rear mirror switching means includes a rotating member which alternatively and in repeating sequence brings reflective and non-reflective surfaces into optical alignment with said rod and said front mirror and wherein said pulse suppression means comprises a diffuse surface extending partially around the edge of one of said laser rod polished faces and located generally so that it is aligned towards the side of said laser rod towards which said rear mirror switching reflecting surface opens.

9. The improvement of claim 1, neglecting other than output losses, wherein said pulse suppression means of said rod extends far enough towards the center of said polished face so as to intercept enough shallow angle beams to obey the relationship $$1 - X < r^{-1} \exp(-2\epsilon\sigma l),$$

where $\epsilon$ = stored energy in Joules/cm³
$\sigma$ = specific gain of the rod material
$r$ = mirror reflectivity
$l$ = rod length
$X$ = single pass loss through the pulse suppression means of said rod.

10. In a Q-switched laser which includes as a laser cavity a front, partially transmissive mirror, a rotating rear mirror switching means, spaced-apart from said front mirror, for causing a rear mirror to be optically aligned for precise retro-reflection with the front mirror only when a laser pulse is desired, and an elongated, solid rod like laser rod member, including polished front and rear faces, positioned between said front mirror and said rear mirror switching means, said laser cavity thereby including four optical surfaces as defined by said front and rear mirrors and said front and rear polished faces of said laser rod, said Q-switched laser further including a flash tube for providing pumping power for said laser, an improvement in said laser cavity to suppress premature lasing action which comprises:

pulse suppression means for preventing the passage of shallow angle reflected or refracted beams through said laser rod, said pulse suppression means being integrally formed on the edge of one of the four optical surfaces which are included in the laser cavity and extending towards the center of said optical surface an extent great enough to allow interception of said shallow angle beams, said pulse suppression means further being positioned to be in general alignment to the direction of opening of said rear mirror to said laser rod.

11. The improved Q-switched laser of claim 10 wherein said rear mirror switching means includes a rotating member which alternatively and in repeating sequence brings reflective and non-reflective surfaces into optical alignment with said rod and said front mirror and wherein said pulse suppression means comprises a bevel portion extending across one polished face of said laser rod and toward the other one of said polished faces, said bevel portion being at an angle with respect to the longitudinal axis of said laser rod that is preferably at least as great as the critical angle of the material from which said rod is formed.

12. The improved Q-switched laser of claim 11 wherein said bevel portion has a polished, reflecting surface.

13. The improved Q-switched laser of claim 11 wherein said bevel portion has a diffuse surface.

14. The improved Q-switched laser of claim 11 wherein said bevel portion comprises a chamfer extending about the entire circumference of said laser rod.

15. The improved Q-switched laser of claim 11 wherein said bevel portion faces said front mirror.

16. The improved Q-switched laser of claim 11 wherein said bevel portion faces said rear mirror.

17. The improved Q-switched laser of claim 10 wherein said rear mirror switching means includes a rotating member which alternatively and in repeating sequence brings reflective and non-reflective surfaces into optical alignment with said rod and said front mirror and wherein said pulse suppression means comprises a diffuse surface formed on one of said laser rod polished faces.

18. The improvement of claim 10, neglecting other than output losses, wherein said pulse suppression means of said laser cavity extends far enough towards the center of said polished face so as to intercept enough shallow angle beams to obey the relationship $$1 - X < r^{-1} \exp(-2\epsilon\sigma l),$$

where
$\epsilon$ = stored energy in Joules/cm³
$\sigma$ = specific gain of the rod material
$r$ = mirror reflectivity
$l$ = rod length
$X$ = single pass loss through the pulse suppression means of said rod.

19. In a Q-switched laser which includes as a laser cavity a front, partially transmissive mirror, a rotating rear mirror switching means, spaced-apart from said front mirror, for causing a rear mirror to be optically aligned for precise retro-reflection with the front mirror only when a laser pulse is desired, and an elongated, solid, rod like laser rod member, including polished front and rear faces, positioned between said front mirror and said rear mirror switching means, said laser cavity thereby including four optical surfaces as defined by said front and rear mirrors and said front and rear polished faces of said laser rod, said Q-switched laser further including a flash tube for providing pumping power for said laser, wherein a premature laser pulse is generated by off axis shallow angle beams which are reflected by the rear mirror before it has rotated into its desired position of alignment, an improved method for the operation of said Q-switched laser to suppress said premature laser pulse which comprises the steps of:

intercepting said off axis shallow angle beams with integrally formed pulse suppression means which are located on the edge of and extend towards the center of one of the optical surfaces which are included in said laser cavity; and disrupting the path of travel of said off axis shallow angle beams with said pulse suppression means sufficiently to quench the amplification process within said laser rod member to thereby suppress generation of a premature laser pulse.

* * * * *